United States Patent
Garg

(10) Patent No.: US 9,348,799 B2
(45) Date of Patent: May 24, 2016

(54) FORMING A MASTER PAGE FOR AN ELECTRONIC DOCUMENT

(75) Inventor: Nitin Kumar Garg, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1567 days.

(21) Appl. No.: 11/484,087

(22) Filed: Jul. 10, 2006

(65) Prior Publication Data

US 2007/0133067 A1    Jun. 14, 2007

(30) Foreign Application Priority Data

Dec. 9, 2005 (IN) .......................... 3318/DEL/2005

(51) Int. Cl.

| | |
|---|---|
| *G06F 17/00* | (2006.01) |
| *G06F 17/20* | (2006.01) |
| *G06F 17/21* | (2006.01) |
| *G06F 17/22* | (2006.01) |
| *G06F 17/24* | (2006.01) |
| *G06F 17/25* | (2006.01) |
| *G06F 17/26* | (2006.01) |
| *G06F 17/27* | (2006.01) |
| *G06F 17/28* | (2006.01) |
| *H04N 1/40* | (2006.01) |
| *H04N 1/387* | (2006.01) |

(52) U.S. Cl.
CPC ............ *G06F 17/211* (2013.01); *G06F 17/248* (2013.01)

(58) Field of Classification Search
CPC . G06F 17/212; G06F 17/211; G06F 17/2288; G06F 17/30056; G06F 17/248; G06F 17/228
USPC ........... 715/243, 229, 200, 255; 358/462, 453
See application file for complete search history.

(56) References Cited

U.S. PATENT DOCUMENTS

| | | | |
|---|---|---|---|
| 4,959,655 A | 9/1990 | Lamiraux | |
| 6,038,574 A * | 3/2000 | Pitkow et al. .................. | 715/210 |
| 6,144,974 A * | 11/2000 | Gartland ........................ | 715/205 |
| 6,405,211 B1 * | 6/2002 | Sokol et al. ............... | 707/103 Y |
| 6,560,620 B1 * | 5/2003 | Ching ............................ | 715/229 |
| 6,697,825 B1 * | 2/2004 | Underwood et al. ......... | 715/207 |
| 6,938,025 B1 * | 8/2005 | Lulich et al. .................... | 706/45 |
| 7,389,471 B2 * | 6/2008 | Croney et al. ................. | 715/209 |
| 7,467,351 B1 * | 12/2008 | Spells et al. .................. | 715/243 |
| 7,469,378 B2 * | 12/2008 | Nagahara et al. ............. | 715/243 |
| 7,505,984 B1 * | 3/2009 | Nevill-Manning . | G06F 17/2211 707/999.101 |
| 7,617,450 B2 * | 11/2009 | Jones et al. .................... | 715/255 |
| 8,255,796 B1 * | 8/2012 | Rosner .................. | G06F 17/248 715/243 |
| 2003/0222921 A1 * | 12/2003 | Rummel ....................... | 345/788 |
| 2003/0237047 A1 * | 12/2003 | Borson ........................ | 715/513 |
| 2004/0060005 A1 * | 3/2004 | Vasey ............................ | 715/513 |
| 2004/0117732 A1 * | 6/2004 | McNeill et al. ............... | 715/513 |
| 2005/0044484 A1 * | 2/2005 | Makela ...................... | 715/501.1 |
| 2005/0060643 A1 * | 3/2005 | Glass et al. ................ | 715/501.1 |
| 2005/0066273 A1 * | 3/2005 | Zacky ........................... | 715/517 |

(Continued)

OTHER PUBLICATIONS

U.S. Appl. No. 11/484,087, filed Oct. 3, 2005, Nitin Kumar Garg.

(Continued)

*Primary Examiner* — Manglesh M Patel
*Assistant Examiner* — Nicholas Hasty
(74) *Attorney, Agent, or Firm* — Kilpatrick Townsend & Stockton LLP

(57) ABSTRACT

Embodiments of methods, apparatuses, systems and/or devices for forming a master page for an electronic document are disclosed.

20 Claims, 4 Drawing Sheets

(56) References Cited

U.S. PATENT DOCUMENTS

Figure 1:
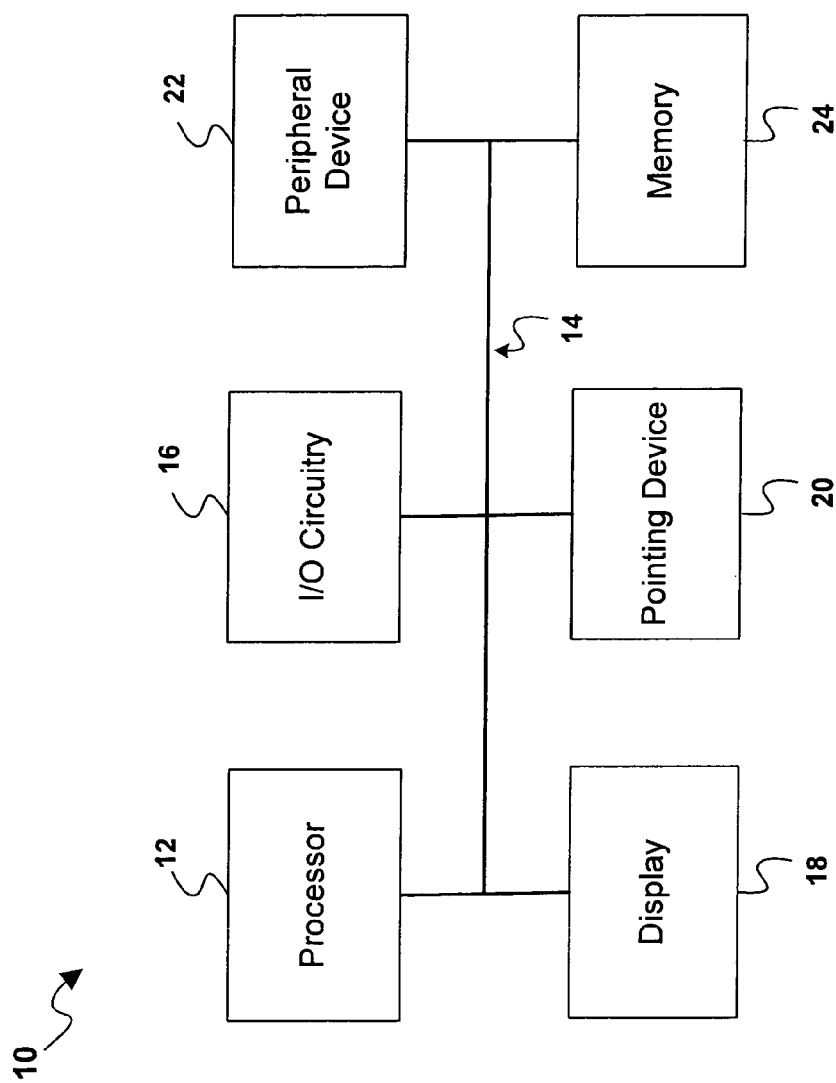

| | | | |
|---|---|---|---|
| 2005/0071755 A1* | 3/2005 | Harrington et al. | 715/511 |
| 2005/0108619 A1* | 5/2005 | Theall et al. | 715/500 |
| 2005/0154980 A1* | 7/2005 | Purvis et al. | 715/513 |
| 2005/0262430 A1* | 11/2005 | Croft | G06Q 10/10 715/226 |
| 2005/0273698 A1* | 12/2005 | Smith et al. | 715/511 |
| 2006/0174186 A1* | 8/2006 | Caro et al. | 715/500 |
| 2006/0271847 A1 | 11/2006 | Meunier | |
| 2006/0282779 A1* | 12/2006 | Collins | G06F 17/248 715/732 |
| 2007/0038959 A1* | 2/2007 | Bertram et al. | 715/846 |
| 2007/0061710 A1* | 3/2007 | Chartier et al. | 715/523 |
| 2008/0010387 A1* | 1/2008 | Curtis et al. | 709/246 |
| 2008/0215966 A1 | 9/2008 | Suarez | |

OTHER PUBLICATIONS

U.S. Appl. No. 11/484,087, filed Oct. 3, 2005, Nitin Kumar Garg, Office Action Mailed Feb. 4, 2009.

Nagy et al., Two Complementary Techniques for Digitized Document Analysis, ACM 1988, 169-176.

\* cited by examiner

FORMING A MASTER PAGE FOR AN ELECTRONIC DOCUMENT

BACKGROUND

Electronic documents may comprise a compilation of data that may be represented in one or more data files and in one or more data formats. Such a compilation of data may be utilized to form a visual representation of the electronic document in any one of several types of media, such as print and/or electronic media. Electronic documents may additionally include data representative of one or more document objects, such as digital images, audio, video, graphics or text, for example. Electronic documents and/or one or more document objects may include formatting, which may include, for example, the layout of objects within the electronic document. The formatting of an electronic document may be represented by a template associated with the electronic document. For example, one type of template comprises a master page.

However, an electronic document may not necessarily be associated with a template document such as a master page. It may be desirable, for a variety of reasons, to form a template document such as a master page and associate the template document with the electronic document. However, presently used techniques for forming template documents such as master pages may be time intensive and/or processing intensive. A method of forming a master page for an electronic document may address one or more of these limitations.

DESCRIPTION OF THE DRAWING FIGURES

Figure 2B:
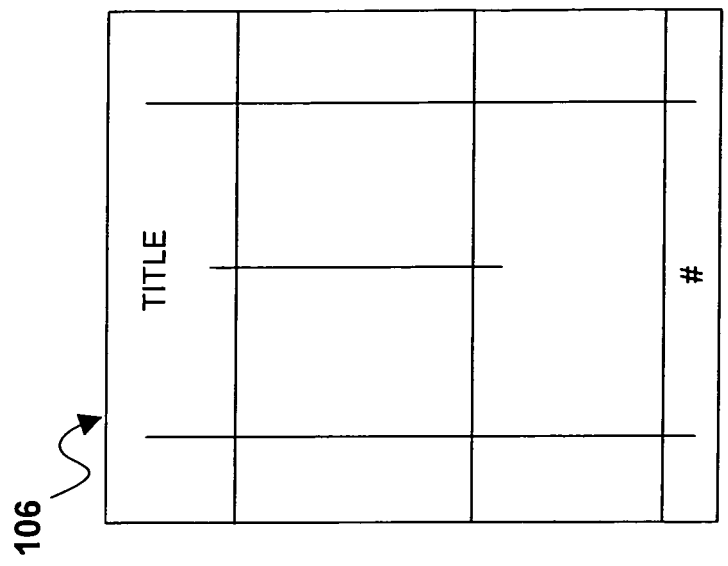
Figure 2A:
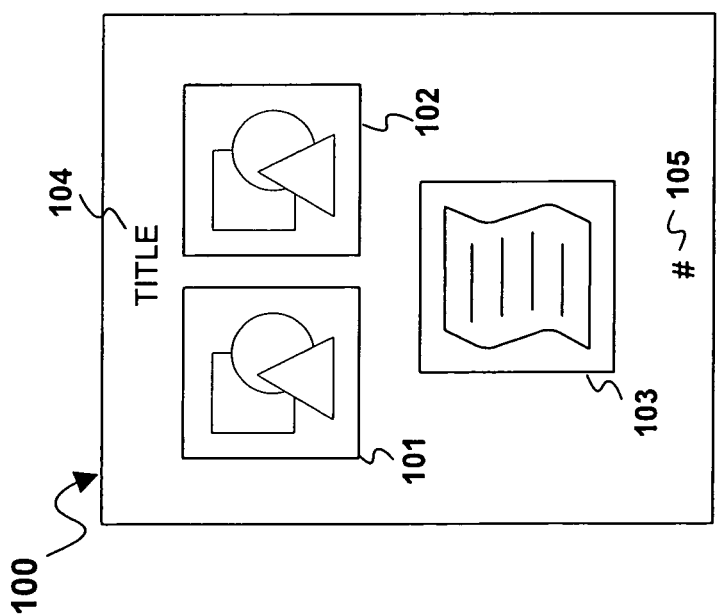
Figure 3:
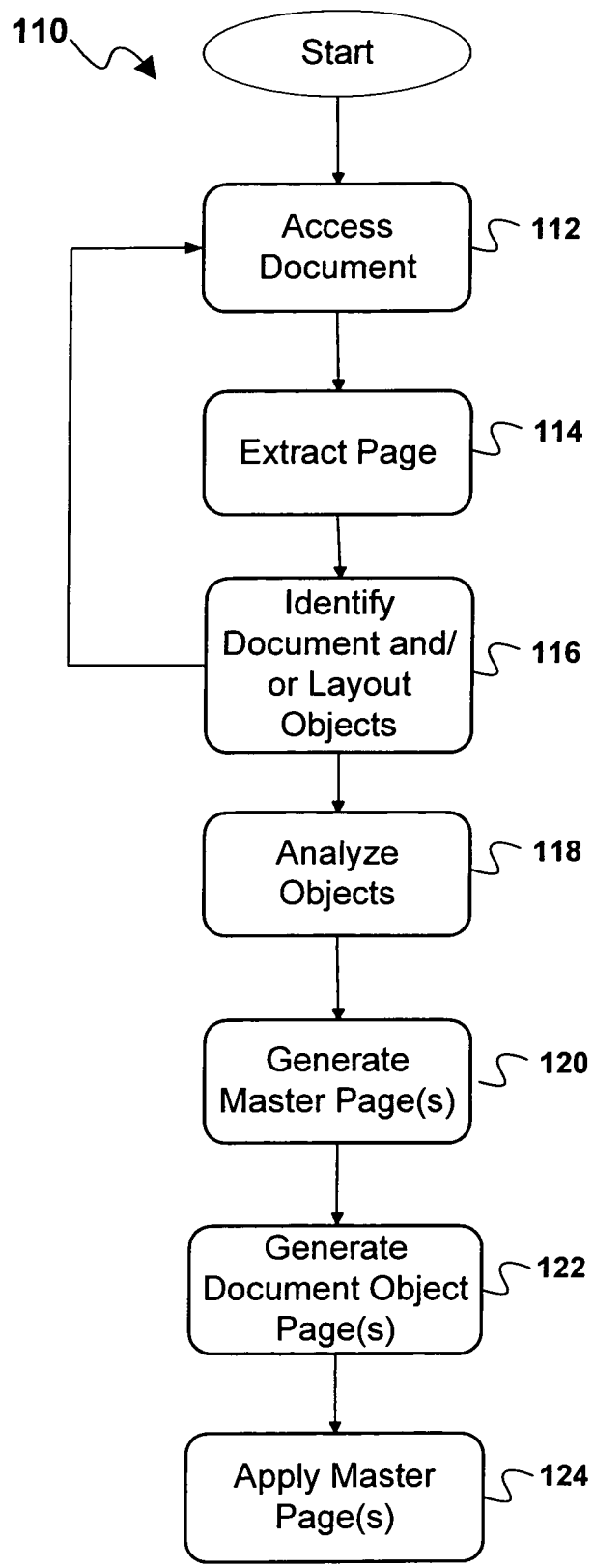
Figure 4:
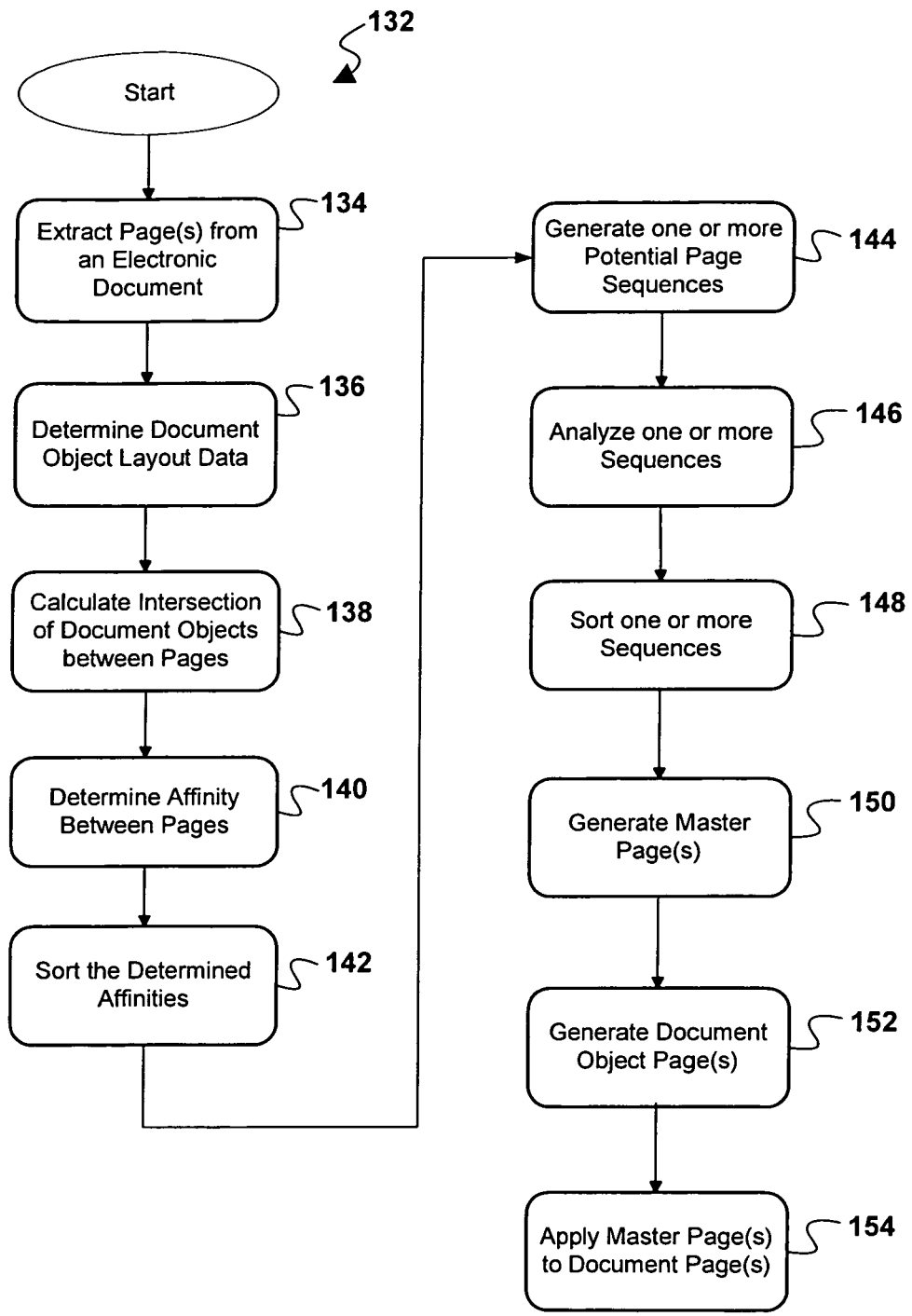

The subject matter regarded as claimed subject matter is particularly pointed out and distinctly claimed in the concluding portion of the specification. Claimed subject matter, however, both as to organization and method of operation, together with objects, features, and advantages thereof, may best be understood by reference to the following detailed description when read with the accompanying drawings in which:

FIG. 1 is a block diagram of computing system capable of implementing one or more embodiments;

FIGS. 2*a* and 2*b* are block diagrams of a viewable document and master page, in accordance with one or more embodiments;

FIG. 3 is a flow diagram illustrating a process of forming a master page, in accordance with one or more embodiments; and FIG. 4 is a flow diagram illustrating a process of analyzing an electronic document and forming a master page, in accordance with one or more embodiments.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of claimed subject matter. However, it will be understood by those skilled in the art that claimed subject matter may be practiced without these specific details. In other instances, well-known methods, procedures, and components have not been described in detail.

As mentioned previously, it may be desirable to form a master page for an electronic document. A master page, in this context, comprises a compilation of electronic data that may be expressed and/or represented on a computing system memory in one or more data formats and/or in one or more data files. A master page may include content and/or formatting that may be associated with one or more portions of an electronic document. The content and/or formatting may appear as cohesive portions of the electronic document when the master page is associated with the electronic document, and the electronic document is embodied in print or electronic media, for example. However, it is worthwhile to note that the claimed subject matter is not so limited, and various embodiments of a master page will be explained in more detail herein. In one embodiment, a master page may be formed by determining the content of one or more pages of an electronic document, identifying common content between and/or among two or more pages of the electronic document, and generating one or more master pages based at least in part on the identified common content, for example. This may enable formation of a master page that may be applied to one or more pages of an electronic document, without the need to manually create a master page. Additionally, in at least one embodiment a process of forming a master page may enable the formation of a master page that may be applied to multiple pages of an electronic document, avoiding the need to form a single master page for every page of an electronic document. However, as will be explained in more detail, numerous other approaches may be taken for forming a master page that are within the scope of claimed subject matter.

Some portions of the detailed description that follows are presented in terms of algorithms, programs or the like and/or symbolic representations of operations on data bits or binary digital signals within a computer memory. These algorithmic descriptions and representations may be the techniques used in the data processing arts to convey the arrangement of a computer system or other information handling system to operate according to the programs.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system or other information handling system.

In the following description and claims, words or terms that connote a conditional occurrence with respect to time, such as when or upon, may mean at a particular instant in time and may also mean near a particular instant in time and may include times preceding the instant in time and times subsequent to the instant in time, for example after a delay period from the particular instant in time. In addition, where a publicly available or commonly utilized standard is discussed, any one or more promulgated versions of the standard may be suitable for any one or more embodiments, and may include prior versions, current versions, and/or future adopted versions.

Embodiments may include apparatuses or systems for performing processes and/or operations described herein. The apparatuses and/or systems may be specially constructed for the desired purposes, or it may comprise a general purpose computing system selectively activated or configured by a program stored in the device. Such a program may be stored on a storage medium, which may comprise a portion of a memory device of a computing system. For example, referring now to FIG. 1, there is illustrated a computing system 10 that may be utilized to implement one or more of the embodiments disclosed herein. However, claimed subject matter is not so limited, and various general purpose systems may be used with programs in accordance with the teachings herein, or it may prove convenient to construct a more specialized apparatus to perform the desired method. Illustrated in FIG. 1 comprises system 10. System 10 in one embodiment may comprise a computing system suitable for executing software instructions to perform one or more of the processes described herein. System 10 may include a processor 12 coupled to a bus 14. Additionally coupled to the bus 14 may be memory 24, which may comprise one or more devices such as one or more types of storage medium as described previously. A program may be stored in the memory device, which may comprise, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device or other information handling system.

System 10 may further include input/output (I/O) circuitry 16, which may be capable of transmitting and/or receiving information. System 10 includes an electronic display device 18, which may be coupled to the bus 14. One or more types of pointing devices 20 may be coupled to the bus 14. Additionally, one or more peripheral devices 22 not described in detail may be included as part of system 10, in at least one embodiment. According to a particular embodiment, although the claimed subject matter is not so limited, computing system 10 may integrate display 18 and I/O circuitry 16 to send and/or receive data on a graphical user interface (GUI). A GUI may be configured to receive one or more inputs from computing system 10, such as by use of a pointing device 20. Additionally, the display device 18 may be capable of displaying a visual representation of one or more files and/or one or more electronic documents, and the visual representation may comprise a viewable document, as will be explained in more detail later.

Electronic documents may include content, such as digital images, audio, video, graphics or text, for example. Content such as this may be referred to as document objects. The document objects may include formatting. For example, formatting may comprise the layout of objects within the electronic document. Electronic documents may be formatted to provide a particular appearance when embodied in media, such as print media and/or electronic media. An electronic document may additionally include multiple pages. The electronic document may include document objects and/or formatting that may be common between and/or among two or more of the pages. For example, an electronic document may have a common header and/or footer on every page in the document. If the electronic document is associated with a master page, the common objects and/or formatting may not necessarily be embodied in the electronic document, but, rather, may be embodied in the master page. The common objects and/or formatting may appear as cohesive portions of the electronic document when embodied in print or electronic media, for example.

Referring now to FIG. 2a, there is illustrated a visual representation of an electronic document, displayed as viewable document 100. Viewable document 100 may be displayed on a display device, such as display 18 of system 10, or may be embodied in print form, such as on sheets of media, for example. Viewable document 100 may comprise a visual representation of a compilation of electronic data that may be expressed and/or represented on a computing system memory in one or more data formats and/or in one or more data files. Viewable document 100 may include document objects 101-105, for example. In this embodiment, document objects 101-102 may comprise graphics; document object 103 may comprise text; document object 104 may comprise a document title; and document object 105 may comprise a document page number. However, claimed subject matter is not so limited and content may comprise one or more types of document objects that may be included in an electronic document. For example, document objects 101, 102 and 103 may comprise one or more types of multimedia content, document object 104 may comprise a title and document object 105 may comprise a page number. The electronic document represented by viewable document 100 may be created by use of a content creation or editing program interface, such as one or more of the products included in ADOBE CREATIVESUITE, such as ADOBE INDESIGN CS or the like, available from ADOBE SYSTEMS INCORPORATED of San Jose, Calif., USA. However, these are merely examples of products that may be used to create an electronic document and claimed subject matter is not limited in this respect.

Viewable document 100 may include formatting data. Formatting data may comprise, for example, page properties such as dimensions and/or file format, and/or layout for the document objects. In at least one embodiment, the layout of document objects may be embodied as layout objects. Layout objects may include frames providing positioning data for positioning one or more document objects, such as headers, footers, logos and titles, for example, in a viewable document. Layout objects may be represented in one or more data files, and/or in one or more data formats. In one embodiment, layout objects may be represented in the same data file(s) that represent document 100. However, alternatively the layout objects may be represented in one or more data files separate from the data files representing document 100, such as master page 106 of FIG. 2b, explained in more detail below.

Although illustrated as a single page, viewable document 100 may include multiple pages. The multiple pages may be similar and/or may vary. In at least one embodiment, portions of the pages may be similar. For example, one or more document objects and/or layout objects may be common between and/or among two or more pages. In one embodiment, header 104 may be common for multiple pages of viewable document 100, and additionally, a page number may appear in multiple pages and may be formatted to be in the same location and/or to have the same dimensions between and/or among pages. For example, page number 105 may vary between and/or among pages, but placement of the page number within the pages may be similar between and/or among pages. The document objects and/or the layout objects that may be common for multiple pages of a multi-page electronic document may be referred to as common objects. The common objects may comprise document objects such as objects 101-105, and/or may include layout objects, such as frames, as illustrated in FIG. 2b.

In at least one embodiment, at least a portion of the common objects may be represented by a template document such as master page 106 of FIG. 2b. In this embodiment, master page 106 includes layout objects such as frames that may provide placement data for document objects 101-105, and may additionally include document objects, such as a title, a header and/or footer. In one embodiment, if master page 106 includes document objects and layout objects, files representing document 100 may not necessarily include the document objects and/or layout objects included in master page 106.

Template documents such as master page 106 of FIG. 2b may provide particular functionality. For example, a master page may provide a capability to lay out common objects that may be common among multiple pages of an electronic document by use of one layout operation, rather than laying out content for each page separately. The common content may comprise part of the master page rather than part of the electronic document. Master pages may additionally provide a capability to have a substantially consistent appearance between and/or among multiple pages of an electronic document. For example, multiple pages of an electronic document may have a title and page number. The title page and page number may have consistent formatting between and/or among pages, such as the same page placement. Consistent formatting between and/or among pages may be obtained by applying a master page including the title and page number to the multiple pages, for example. Application of a master page to a page of an electronic document may result in a viewable document being formed that includes master page data and electronic document page data. In this example, if the master page is altered, the electronic document page may additionally be altered, for example. Multiple pages of an electronic document may have the same or substantially the same formatting data, such as similar headers and footers, similar page number location, similar content and/or object format and/or layout and/or similar page layouts, for example. The formatting data may be embodied on a master page, and as a result the multiple pages may have substantially the same appearance with respect to the formatting data.

Master pages, such as master page 106 may additionally provide functionality including enabling particular software applications to access an electronic document. For example, particular software applications such as page layout applications may necessarily access a master page when opening an associated electronic document. If there is no master page associated with an electronic document, these types of software applications may not be capable of opening the document. Although the claimed subject matter is not so limited, software applications such as these may include ADOBE INDESIGN CS and OUARKXPRESS 7.0, for example. It may be desirable to provide a capability to generate one or more master pages for an electronic document that may not necessarily have one or more associated master pages, if a software application such as this is utilized to access and/or open the electronic document, for example.

Master pages such as master page 106 may be formed by use of one or more techniques, but claimed subject matter is not limited to any particular technique. In one embodiment, ADOBE FRAMEMAKER may be utilized to create and/or apply one or more master pages to one or more pages of an electronic document, which may enable creation of pages having similar content being formatted in a similar manner. A process of applying a master page to one or more pages of an electronic document may be referred to as 'mapping' or 'linking' master pages to document pages, although claimed subject matter is not so limited. For a variety of reasons it may be desirable to employ an approach or technique that may enable substantially automatically generating a master page for at least one page of an electronic document. For example, without limiting the claimed subject matter, one technique for forming a master page is illustrated in FIG. 3, and explained in more detail below. Of course, many techniques or implementations are possible within the scope of claimed subject matter and claimed subject matter is not limited in scope to this particular example.

FIG. 3 is a flow diagram, according to one embodiment, of a process 110 of forming a master page. However, for flow diagrams presented herein, the order in which the blocks are presented does not necessarily limit claimed subject matter to any particular order. Additionally, intervening blocks not shown may be employed without departing from the scope of claimed subject matter. Flow diagrams depicted herein may, in alternative embodiments, be implemented in a combination of hardware, software and/or firmware, such as part of a computer system. The functionality of process 110 may be executed manually, such as by a user, and/or may be executed in response to a software application such as a page layout application attempting to access an electronic document, wherein the electronic document may not have one or more associated master pages, for example.

As previously suggested, it may be desirable to employ an approach or technique for forming a master page. The master.page may be formed based at least in part on the content of an electronic document and/or the layout of the content. One technique is illustrated in process 110. In this process, at block 112, an electronic document is accessed. Accessing may comprise the action of a computing system such as system 10 opening one or more data files, such as one or more data files representing an electronic document. Accessing may comprise a utilizing a software program to access one or more data files of an electronic document. As mentioned previously, particular software applications such as page layout applications may not be capable of opening an electronic document if there is no master page associated with an electronic document. In one embodiment, process 110 may be executed in response to an attempt by software such as a page layout application to access an electronic document not having one or more associated master pages. The electronic document may include one or more pages, and the pages may include document objects and layout objects, such as headers, footers, title and page numbers, graphics, text, and associated frames, for example.

At block 114, a page of the accessed document is extracted. Extracting a page may comprise accessing one or more data files to obtain one or more portions of data representing the page of the electronic document, such as document object data and/or layout object data, for example. At block 116, document objects and/or layout objects for the extracted page may be identified. Identified document objects and/or layout objects may be determined from one or more portions of the extracted page and/or files representing the extracted page. The identified document and layout objects may comprise one or more types of objects as described previously. One or more portions of the functionality of blocks 112, 114 and/or 116 may be repeated for additional pages of the accessed document, such as if the document includes additional pages.

At block 118, one or more portions of the identified objects from block 116 are be analyzed to determine the occurrence of common objects between and/or among at least a portion of the extracted pages. Common objects, in this context, may comprise document objects and/or layout objects that occur in two or more pages of an electronic document. Analysis of the data may comprise determining one or more properties of the data, such as recurrence of similar and/or identical layout objects and/or document objects between and/or among multiple pages of the accessed document, for example. In one embodiment, analysis of the extracted page data may comprise recognizing one or more patterns with respect to two or more extracted pages of an electronic document. Analysis of extracted page data may be performed by use of numerous techniques, and claimed subject matter is not so limited. However, one particular embodiment of analyzing data such as this may be explained in greater detail with reference to FIG. 4.

At block 120, one or more master pages are generated. The particular number of master pages generated may depend at least in part on the number of pages of the electronic document and/or based at least in part on the analysis performed at block 118. For example, two or more pages of an electronic document may have a similar or identical layout, and may have common objects. A single master page including the common objects may be generated for the two or more pages of the electronic document, if the two or more pages have a similar or identical layout, for example. However, in other instances a single master page may be generated for single pages of an electronic document, such as if the single pages do not have similar layouts. In one embodiment, generation of a master page may comprise generating a page having one or more document objects and/or layout objects, such as frames, header and/or footer data, title data and/or one or more additional types of data that may be determined to be common objects at block 118.

At block 122, one or more document object pages are generated. A document object page, in this context, may comprise a page including document and layout objects of an extracted page, but without the identified common document objects and layout objects identified at block 118, for example. The common objects may be included in the master page formed at block 120, and may not necessarily be included in the document object page. The document object pages generated may be represented in one or more data files, and the one or more data files may include objects, for example. A document object page may be generated for pages extracted at block 114, for example. In one embodiment, generation of a document object page may comprise removing common objects from an extracted page of an electronic document, such that the extracted page retains objects not included in an associated master page.

At block 124, the generated master pages are applied to the generated document object pages. Application of a master page may result in the master page being associated with the one or more document object pages, and, when associated the master page may provide common objects for the document object page, such as document objects and/or layout objects. Associating a master page to a generated object page of an electronic document may application of a master page to the linked page of an electronic document. For example, if one or more portions of a master page are subsequently altered, the formatting of the objects included in an object page may additionally be altered in response. This may enable altering the layout of multiple pages of an electronic document by altering a single master page. Additionally, application of the functionality of process 110 may enable a software application such as a page layout application to open an electronic document, by generating master pages when the software program attempts to access the document, for example.

As mentioned previously, in at least one embodiment a master page may be generated by identifying common objects between and/or among two or more pages of an electronic document, and generating a master page that may include the objects common to two or more pages. Without limiting the scope of the claimed subject matter, one technique that may be employed to identify common objects and generate one or more master pages is described below. However, it is worthwhile to note that numerous other techniques in accordance with the claimed subject matter may be implemented. These numerous other techniques may result in the generation of a master page for an electronic document, wherein the master page is generated based at least in part on the content of an electronic document and/or the layout of the content. In one example embodiment, common objects for multiple pages of an electronic document may be identified. The pages that include the identified common objects may additionally be grouped. The groupings may form one or more groupings of pages. The pages may be grouped by assigning relevance of each page as compared to the other pages, and sorting the pages into groups by grouping the pages with the highest relevance. Relevance, in this context, refers generally to a number of common objects that may exist between and/or among pages. In one embodiment, pages having a high number of common objects may be grouped. For example, two pages with high relevance may include a relatively high number of common objects with respect to one another, and may be grouped. The groupings of pages may additionally be analyzed, and the groups may be ranked. The groups may be ranked among other groups of pages, such as from the greatest number of common objects to the smallest number of common objects. In at least one embodiment, one or more master pages may be generated based on the ranked groupings of pages. In one example, a master page may be generated for each group, and/or for groups having a high ranking, as just an example. This may enable formation of one or more master pages for an electronic document, wherein the formed master page(s) may be associated with multiple pages of an electronic document rather than a single page, for example. However, as mentioned previously, numerous other approaches may be implemented and remain within the scope of the claimed subject matter.

FIG. 4 is a flow diagram, according to one embodiment, of a process 132 of analyzing page layout data, and forming at least one master page based at least in part on the analysis. However, as previously suggested, other embodiments may not employ the approach set forth by process 132, but remain in accordance with at least one embodiment. However, in this embodiment, at block 134, one or more pages are extracted from an electronic document, such as document 100 of FIG. 2a, for example. The one or more pages may include document objects and/or layout objects, such as described previously. At block 136, document objects and/or layout objects for the extracted page(s) may be identified. Identified document objects and/or layout objects may be determined from one or more portions of the extracted page and/or files representing the extracted page.

At block 138, objects common between and/or among two or more pages may be identified, and, based at least in part on the identified common objects, 'intersection' data may be determined. An intersection, in this context, comprises the occurrence of common document and/or layout objects between and/or among two or more pages of an electronic document. For example, if two pages of an electronic document have document objects positioned with the same layout, an intersection may exist for the portions of the pages having the same layout. In at least one embodiment, the intersection data may be compiled in a grouping of data that may be referred to as an intersection matrix.

For example, an electronic document may include seven pages. The seven pages may include document objects and layout objects, and portions of the document and layout objects may be the same between and/or among multiple pages. An intersection matrix may identify which pages have common document objects or layout objects. One example matrix is show below as table 1. However, this is just an example, and claimed subject matter is not so limited.

TABLE 1

| Page | 1 | 2 | 3 | 4 | 5 | 6 | 7 |
|---|---|---|---|---|---|---|---|
| 1 | N/A | X | | X | | | |
| 2 | X | N/A | | X | | | |
| 3 | | | N/A | | | | |
| 4 | X | X | | N/A | | X | |
| 5 | | | | | N/A | | |
| 6 | | | | X | | N/A | X |
| 7 | | | | | | X | N/A |

As shown in table 1, pages 1 and 2 have common objects, or an kewise, so do pages 1 and 4; 2 and 4; 4 and 6; and 6 and 7. Alternatively, as mentioned previously, the intersection may include identifying a quantity of commonality such as on a percentage basis, and, in this embodiment, rather than just indicating that an intersection exists, the intersection matrix may include values such as percentage values. For example, an intersection of 100% between and/or among two pages of an electronic document may indicate that the two pages have the same layout, for example. However, the numerical measure of an intersection is not limited to a percentage basis, and may comprise any type of quantity that may provide a measure of commonality between and/or among pages.

As stated previously, an intersection between and/or among two or more pages may indicate the occurrence of common document and/or layout objects between and/or among two or more pages. In one embodiment, intersection data may be determined in the following manner: at least a portion of the identified objects from one extracted page is compared to the identified objects from one or more additional extracted pages. A determination of whether there are any common objects between and/or among two or more pages may enable a determination of whether there is a similar layout for two or more pages of an electronic document. Determining intersection data may comprise one or more types of pattern recognition, such as a method for recognizing patterns for document pages as applied to document layout data.

At block 140, pages having common objects may be ranked with respect to each other. This may comprise determining the 'affinity' between and/or among pages. Affinity, in this context, may comprise a measure of the number of and/or weighted total of common objects included in two or more pages. Affinity may be determined by weighting the common objects based at least in part on the type of object, such as by assigning greater weight for particular objects, for example, and/or may comprise a number of common objects. In one example, graphics and/or text may be assigned a differing weight than other objects. Therefore, similar occurrences of these types of objects between and/or among two or more pages may be assigned a greater weight, and thus the pages having common objects such as these will have a greater affinity with respect to each other than two other pages that may not include these objects, for example. At block 142, the determined affinities are sorted. This may comprise sorting the affinities of the extracted pages by numerical value, and/or grouping the affinities. For example, pages with high affinities with respect to each other may be grouped. This may result in particular pages being sorted and/or grouped, for example.

At block 144, one or more potential page sequences are generated. A potential page sequence, in this context, comprises a grouping of pages of an electronic document that may have a particular affinity. The grouping of pages may include pages having common objects, as explained previously. The particular number of potential page sequences generated may depend at least in part on the analysis performed at blocks 138-142. For example, two pages of an electronic document may have a similar or identical layout, and may have common objects. These pages may be found to have a high affinity with respect to each other, and the pages may be grouped as a potential page sequence. Additionally, one of the pages of the formed group may also have a high affinity with respect to another page, and these pages may form a potential page sequence. However, in other instances a single page may comprise a potential page sequence, such as if no pages have a similar or identical layout, for example.

At block 146, one or more of the generated potential page sequences may be analyzed. In one embodiment, analysis of the sequences may comprise determining a number of common objects that occur in sequences common for pages in the sequence. The number of common objects may be determined for the generated sequences, and a determination may be made for which sequence(s) have the greatest number of common objects. In this embodiment, the occurrence of the greatest number of common objects within a sequence may be referred to as the Highest Common Factor (HCF) sequence.

At block 148, the sequences are sorted. The sequences may be sorted based on the number of common objects that may be determined to exist in each sequence. For example, the sequences may be sorted by use of the determined HCF, for example. Additionally, sequences may be sorted based on a number of electronic document pages included in the sequence and/or patterns found in the sequence. For example, a particular number of electronic document pages may be grouped in a sequence. The electronic document pages may have a pattern, such as every. other page from the electronic document being grouped in one sequence. This may indicate, for example, that every other page of the document comprises a similar layout. In this embodiment, a sequence such as this may be weighted higher than a sequence without the same number of pages. In one example, wherein a page may have been added to two or more sequences at block 144, the page may then be selectively removed from one or more sequences, such that a page may be only in a single sequence. For example, a page may be grouped in two or more sequences, and one sequence may be determined to be an HCF sequence. The page may be removed from as sequence that is not the HCF sequence, and may be retained in a HCF sequence. However, claimed subject matter is not so limited, and in other embodiments there may not be pages added to more than one sequence, as mentioned previously.

At block 150, a master page is generated for one or more of the pages of at least a portion of the sequences. The generated master page may be generated based on the analysis of block 146 and/or the sorting of block 148. For example, a master page may be generated for a determined HCF sequence. However, alternatively a master page may be generated for each sequence, and thus a single master page may not necessarily be generated for each extracted page, for example.

At block 152, one or more document object pages are generated. As described previously, a document object page may include objects of an extracted page that were not identified as common objects, for example. The particular number of object pages generated may equal the number of pages extracted from the electronic document. At block 154, the generated one or more master pages may be applied to the generated object pages. Application of a master page may associate the master page with the one or more document object pages, and, when associated the master page may provide formatting data for one or more objects of a document object page, for example. Application of a master page to a document object page may result in the objects included in the page being formatted based at least in part on the formatting data included as part of the master page. This may enable altering a layout of multiple pages of an electronic document by altering a single master page that is linked to multiple document object pages, for example.

Formation of one or more master pages, and application of the master pages to generated document object pages of an electronic document may provide master pages for an electronic document that may not have associated master pages. Application of the functionality of flow diagram 132 may enable a software application such as a page layout application to open an electronic document not having one or more associated master pages. This capability may be provided by generating master pages when the software program attempts to access the document, for example.

The foregoing discussion details several possible embodiments for accomplishing this, although these are merely examples and are not intended to limit the scope of claimed subject matter. Based at least in part on the foregoing disclosure, it should be apparent that a combination of hardware, software and/or firmware may be produced capable of performing one or more of the functions as described herein. It will additionally be understood that, although particular embodiments have just been described, claimed subject matter is not limited in scope to a particular embodiment or implementation. For example, a system capable of implementing one or more of the foregoing operations may comprise hardware, such as implemented to operate on a device or combination of devices, for example, whereas another embodiment may be in software and hardware, for example.

Additionally, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
   determining that an electronic document lacks a master page based on a viewer application being unable to open the electronic document for viewing without the master page; and
   based on determining that the electronic document lacks the master page:
      determining a layout of at least some objects included in a page of the electronic document;
      comparing the at least some objects or the determined layout of the at least some objects to at least one additional object included in at least one additional page of the electronic document to identify common objects or a common object layout between the page and the at least one additional page; and
      based at least in part on the comparison, automatically generating:
         a user-editable master page that is associated with the electronic document and that includes at least a portion of the identified common objects or object layout; and
         at least one document object page that is associated with the electronic document and that omits the identified common objects or object layout of the master page.

2. The method of claim 1, wherein the electronic document comprises an electronic document in portable document format (PDF) format.

3. The method of claim 1, wherein the master page does not include objects not common to both the page of the electronic document and the at least one additional page of the electronic document.

4. The method of claim 1, further including applying the automatically generated master page to the automatically generated at least one document object page, the master page providing the identified common objects and/or object layout to the at least one document object page.

5. The method of claim 1, further comprising altering the identified common objects or objects layouts included in the at least one document object page in response to at least one portion of the master page being altered.

6. The method of claim 1, wherein comparing the identified objects to the at least one additional object comprises:
   generating a plurality of sequences of at least some pages from the electronic document, wherein each sequence includes the page and the at least one additional page and wherein each sequence is generated from pages having common objects; and
   determining a sequence from the plurality of sequences having a highest common factor indicative of the sequence having a larger number of common objects than any other sequence of the plurality of sequences;
   wherein the master page is generated based on the sequence having the highest common factor.

7. The method of claim 1, wherein determining the common object layout between the page and the at least one additional page comprises determining that the at least some objects and the at least one additional object have identical positioning data and formatting data in both the page and the at least one additional page.

8. The method of claim 1, wherein determining the common object layout between the page and the at least one additional page comprises determining that the page includes at least one frame for positioning document objects and that the at least one additional page includes at least one additional frame for positioning document objects, wherein the at least one frame and the at least one additional frame have common positioning data.

9. A method of identifying layout patterns in an electronic document, comprising:
   determining that an electronic document lacks a master page based on a viewer application being unable to open the electronic document for viewing without the master page; and
   based on determining that the electronic document lacks the master page:
      identifying a layout for at least one document object included in at least one page of an electronic document having a plurality of pages;
      identifying an intersection comprising an occurrence of at least one document object or at least one layout being respectively included in at least two pages of the electronic document;

determining a measure of commonality between the at least two pages for the at least one document object or the at least one layout based at least in part on the identified intersection; and based at least in part on the determined measure of commonality, automatically generating:

at least one user-editable master page associated with the electronic document that includes at least a portion of the least one document object or the at least one layout, wherein editing the at least one master pages updates the plurality of pages within the electronic document to reflect the editing of the at least one master page; and at least one document object page that is associated with the electronic document and that omits the least one document object or the at least one layout common to the at least two pages.

10. The method of claim 9, wherein the electronic document comprises an electronic document in portable document format (PDF) format.

11. The method of claim 9, wherein the measure of commonality is determined for the at least one document object based on a weight assigned to the at least one document object.

12. The method of claim 11, further comprising assigning a higher weight to the at least one document object than other types of document objects based on the at least one document object including graphics.

13. The method of claim 11, further comprising assigning a higher weight to the at least one document object than other types of document objects based on the at least one document object including graphics.

14. The method of claim 9, wherein automatically generating the at least one user-editable master page based at least in part on the determined measure of commonality comprises:

generating a plurality of page sequences, wherein each page sequence of the plurality of page sequences includes a grouping of pages in the electronic document having a respective measure of commonality with respect to at least one respective object or at least one respective layout for the grouping of pages;

determining that a highest common factor sequence from the plurality of page sequences has a highest measure of commonality among pages of the page sequences, wherein the highest common factor sequence includes the at least two pages; and generating the master page from the highest common factor sequence.

15. The method of claim 9, wherein automatically generating the at least one user-editable master page based at least in part on the determined measure of commonality comprises:

generating a plurality of page sequences, wherein each page sequence of the plurality of page sequences includes a grouping of pages in the electronic document having a respective measure of commonality with respect to at least one respective object or at least one respective layout for the grouping of pages;

determining that subset of page sequences from the plurality of page sequences have measures of commonality exceeding a threshold measure of commonality;

selecting at least one page sequence from the subset of page sequences having a number of pages greater than a threshold number of pages, wherein the at least one page sequence comprises the at least two pages; and generating the master page from the at least one page sequence.

16. A non-transitory machine-readable medium having stored thereon instructions executable by a processor, the instructions comprising:

instructions for determining that an electronic document lacks a master page based on a viewer application being unable to open the electronic document for viewing without the master page; and instructions for responding to determining that the electronic document lacks the master page by:

identifying the layout for at least one document object included in at least one page of an electronic document having a plurality of pages;

identifying an intersection comprising an occurrence of at least one document object or at least one layout being respectively included in at least two pages of the electronic document;

determining a measure of commonality between the at least two pages for the at least one document object or the at least one layout based at least in part on the identified intersection; and based at least in part on the determined measure of commonality, automatically generating:

at least one user-editable master page associated with the electronic document that includes at least a portion of the least one document object or the at least one layout, wherein editing the at least one master pages updates the plurality of pages within the electronic document to reflect the editing of the at least one master page; and at least one document object page that is associated with the electronic document and that omits the at least one document object or the at least one layout common to the at least two pages.

17. The machine-readable medium of claim 16, wherein identifying layout data comprises extracting page data for one or more pages of the electronic document and determining one or more properties of the extracted data.

18. The machine-readable medium of claim 16, wherein said storage medium further includes instructions comprising:

instructions for identifying at least a portion of the layout of a page of an electronic document;

instructions for comparing the identified layout to an identified layout of one or more additional pages of the electronic document, to identify recurring object and/or layout patterns; and instructions for assigning a value to the intersection between the compared pages based at least in part on the comparison.

19. A system comprising:

a processor; and a non-transitory machine-readable medium coupled to the processor;

wherein the processor is configured for executing instructions stored in the non-transitory machine-readable medium to perform operations comprising:

determining that an electronic document lacks a master page based on a viewer application being unable to open the electronic document for viewing without the master page; and responding to determining that the electronic document lacks the master page by:

determining a layout of at least some objects included in a page of the electronic document;

comparing the identified objects or the determined layout of the objects to at least one additional object included in at least one additional page of the electronic document to identify common objects or a common object layout between the page and the at least one additional page; and based at least in part on the comparison, automatically generating:

a user-editable master page that is associated with the electronic document and that includes at least a portion of the identified common objects or object layout; and at least one document object page that is associated with the electronic document and that omits the identified common objects or object layout of the master page.

20. The method of claim 1, wherein the electronic document comprises a plurality of pages, wherein the master page comprises electronic data comprising at least one of a visual object, a formatting of visual objects, and a layout of visual objects, wherein the at least one of visual content, formatting of visual content, and layout of visual content in the plurality of pages is controlled by the at least one of the visual object, the formatting of visual objects, and the layout of visual objects.

* * * * *